United States Patent
Peltier et al.

(10) Patent No.: US 6,634,011 B1
(45) Date of Patent: Oct. 14, 2003

(54) METHOD AND APPARATUS FOR RECORDING PROGRAM EXECUTION IN A MICROPROCESSOR BASED INTEGRATED CIRCUIT

(75) Inventors: Steven T. Peltier, Mountain View, CA (US); David X. Zhang, San Jose, CA (US); Kenneth C. Yeager, Sunnyvale, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 185 days.

(21) Appl. No.: 09/788,195

(22) Filed: Feb. 15, 2001

(51) Int. Cl.⁷ .............................................. G06F 17/50
(52) U.S. Cl. ................................ 716/4; 716/5; 717/127; 717/128
(58) Field of Search .......................... 716/1–5, 16–18; 711/120, 123–126; 717/127–131, 154, 158

(56) References Cited

U.S. PATENT DOCUMENTS

| | | | | |
|---|---|---|---|---|
| 4,525,780 A | * | 6/1985 | Bratt et al. ................. | 711/163 |
| 5,274,811 A | * | 12/1993 | Borg et al. ................. | 717/128 |
| 5,608,720 A | * | 3/1997 | Biegel et al. ............... | 370/249 |
| 6,009,270 A | * | 12/1999 | Mann ......................... | 717/128 |

\* cited by examiner

*Primary Examiner*—Leigh M. Garbowski
*Assistant Examiner*—Paul Dinh
(74) *Attorney, Agent, or Firm*—Baker Botts L.L.P.

(57) ABSTRACT

An integrated circuit (10) includes a central processing unit (12), an instruction cache (14), a data cache, (16), and a trace recorder. The central processing unit (12) interacts with the instruction cache (14) and the data cache (16) in order to execute instructions. Profile information passed between the central processing unit (12), the instruction cache (14), and the data cache (16) not normally available for external analysis may be captured by the trace recorder (20) in response to various execution points in a program being executed by the central processing unit (12). The profile information captured by the trace recorder (20) may subsequently be provided to external analysis equipment in order to analyze the operation of the central processing unit (12) for study of program execution.

20 Claims, 9 Drawing Sheets

METHOD AND APPARATUS FOR RECORDING PROGRAM EXECUTION IN A MICROPROCESSOR BASED INTEGRATED CIRCUIT

TECHNICAL FIELD OF THE INVENTION

The present invention relates in general to integrated circuit operation and more particularly to a method and apparatus for recording program execution in a microprocessor based integrated circuit.

BACKGROUND OF THE INVENTION

The ultimate test for the design of a microprocessor based integrated circuit is its operation in a system environment. However, the system environment provides little, if any, information about the internal state of the microprocessor to assist in diagnosing any failure that may occur during testing or studying the function of a program being executed by the microprocessor during normal operation. At best, external logic analyzers collect trace data from the system bus and secondary cache interface external to the microprocessor. More often, only the system trace data is captured as the secondary cache interface trace data is difficult mechanically and electrically to capture due to the complex network of short high frequency paths. Even if captured, these external signals provide no ability to determine the internal operation of the microprocessor. One key to solving this problem is to replicate the failure or specific program execution using a diagnostic program short enough to run in a chip tester and a simulator. The difficulty lies in the fact that the diagnostic program must accurately duplicate the processor state associated with a failure or corresponding to a desired execution point. During actual operation of the microprocessor, its dynamic state greatly depends on branch predictions and cache refills. Out of order execution adds another level of complexity to any debugging or program analysis efforts. Without guessing, this information is difficult to reconstruct.

Previous approaches to solving this problem include identifying what instruction was being executed upon the occurrence of a failure, tag an instruction and see how it executes, and counting events over an interval of time. These approaches do not provide information with respect to immediately preceding instructions which set up the desired execution point to be analyzed or are the initiating causes of a failure nor do they illustrate penalties for individual mispredicted branches or cache misses. Therefore, it is desirable to identify the internal state of a processor in order to analyze program execution or identify causes of failure.

SUMMARY OF THE INVENTION

From the foregoing, it may be appreciated by those skilled in the art that a need has arisen to record information related to internal operation of a microprocessor in order to analyze and study the operation of a program being executed by the microprocessor. In accordance with the present invention, a method and apparatus for recording program execution in a microprocessor based integrated circuit are provided that substantially eliminate or greatly reduce disadvantages and problems of conventional system program analysis techniques.

According to an embodiment of the present invention, there is provided a method for recording program execution in a microprocessor based integrated circuit that includes identifying an execution point in a program running in a central processing unit of the microprocessor based integrated circuit. Profile information transferred to and from the central processing unit and associated with the execution point is captured for study and analysis. A trace recorder co-located with the central processing unit in the microprocessor based integrated circuit is used to capture the profile information of the desired execution point. The trace recorder is operable to selectively record the profile information in response to various execution points and circuit operations in order to capture operational information that occurs around an execution point or specific circuit operation. In this manner, execution of a program running in the central processing unit can be studied and analyzed.

The present invention provides various technical advantages over conventional system program analysis techniques. For example, one technical advantage is to place a trace recorder on the integrated circuit with the microprocessor. Another technical advantage is to record information pertaining to a routine or program running in a central processing unit during actual operation. Yet another technical advantage is to use execution points in the routine or program to determine when and what profile information to capture. Other technical advantages may be readily ascertained by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
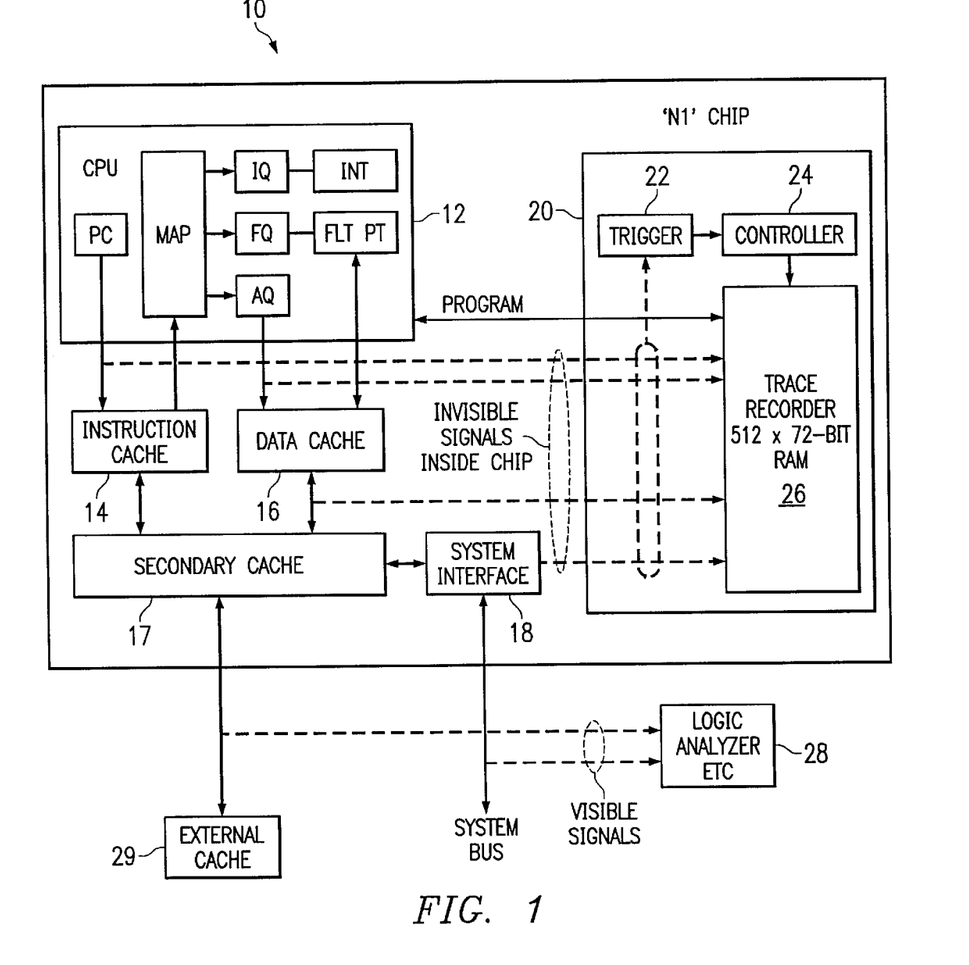
FIG. 1 illustrates a block diagram of a microprocessor based integrated circuit.

FIG. 1 is a block diagram of a microprocessor based integrated circuit 10. Integrated circuit 10 includes a central processing unit 12, an instruction cache 14, a data cache 16, a secondary cache 17, and a system interface 18. Integrated circuit 10 also includes a trace recorder 20 that has trigger logic 22, control logic 24, and a memory array 26. Trace recorder 20 captures and stores internal signals within integrated circuit 10 in its memory array 26 as determined by trigger logic 22 and control logic 24. A logic analyzer 28 or other type of test equipment may analyze the operation of integrated circuit 10 as it interfaces with an external cache 30 or other system elements through a system bus 32. Logic analyzer 28 may also be used to check the internal operation of integrated circuit 10 by analyzing internal signals captured in memory array 26 and provided through system interface 18.

Trace recorder 20 may operate in at least two modes, a read/write mode and a capture mode. In read/write mode, data may be read from or written to memory array 26. The read/write mode is initiated by a pair of command and data instructions, either MTC0/MFC0 instructions (read) or captured and maintained prior to and subsequent to the occurrence of the triggering event. Captured information may be used to determine appropriate triggering events. Table 1 shows an example of the data format for captured information in memory array 26.

TABLE 1

Trace Recorder Cache Memory (TRCache) Data Format

| Bit | # of Bit | Input Signal Source | Mux Select (Select Source 2) | Input Signal Source 2 | Description |
|---|---|---|---|---|---|
| 0 | 1 | Inactive | | | see description for bit 15:8 |
| 1 | 1 | Trigger | | | there was a trigger during the cycle |
| 7:2 | 6 | IF0D0IVA[7..2] | | | Instruction virtual address |
| 15:8 | 8 | IF0D0IVA[15..8] | TRCache[0] | InactiveCount | data hasn't changed for InactiveCount |
| 16 | 1 | IF0D0IVA[16] | IVASel | AQ-LinkBitN | ll/sc link bit |
| 20:17 | 4 | IF0D0IVA[20:17] | IVASel | PD0DCmd | CCBlk to AQ command or response |
| 21 | 1 | IF0D0IVA[21] | IVASel | NP0Store | AQ request was store |
| 22 | 1 | IF0D0IVA[22] | IVASel | (PD01Cmd != 0) | CCBlk to IFetch command or response |
| 26:23 | 4 | IF0D0IVA[26:23] | IVASel | DT??? | LdSt address and Bank and Way info |
| 27 | 1 | IF0D0IVA[28] | IVASel | CD0Winner NoneF | More MHT info |
| 28 | 1 | IF0D0IVA[28] | IVASel | SCDWrB | Data is being written to scache |
| 31:29 | 3 | IF0D0IVA[31:29] | | | |
| 32 | 1 | IFValidNotDecode | | | any instructions valid but not decoded |
| 38:33 | 6 | GR0D0ActQTag0[5:0] | | | Active list write pointer |
| 44:39 | 6 | GRactct1.0.RdPtr[5..0] | | | Active list read pointer |
| 45 | 1 | GR0InExc | | | "Interrupt" type of exception |
| 46 | 1 | GR2W0ExcPendB | | | Other type of exception |
| 47 | 1 | DT2E2LoadDone | | | LoadDone |
| 48 | 1 | NP0IFGoes | | | IFetch request sent to MHT |
| 49 | 1 | NP0LSGoes | | | AQ request to MHT |
| 54:50 | 5 | CDValid[4..0] | | | Valid entries in MHT |
| 55 | 1 | PC0PrcReqRdy | | | |
| 56 | 1 | PR9SysGntInB | SysTrVal | SysCmd[4] | |
| 57 | 1 | PR9SysValInB | SysTrVal | SysCmd[5] | |
| 58 | 1 | EA0SysValOutB | SysTrVal | SysCmd[6] | |
| 59 | 1 | PR9SysRespValInB | SysTrVal | SysCmd[7] | |
| 61:10 | 2 | PR9SysRespIn[1:0] | SysTrVal | SysCmd[9:8] | |
| 62 | 1 | SysCmd[11] | SysTrVal | SysCmd[10] | |
| 63 | 1 | SysTrVal | | | Set when the Source 1 group of traced System interface sigs are valid. Source 2 group is valid in next cycle unless inactive indicator is set. |

MTC0/MTC0 instructions (write) The first MTC0 instruction determines what element within trace recorder 20 is read or written to. After a read or a write occurs, trace recorder 20 is returned to a reset state. In capture mode, data is stored in memory array 26 as determined by trigger logic 22 and control logic 24. A single MTC0 instruction may be used to initiate the capture mode. Entries are written in each processor clock according to key signal values gathered from across integrated circuit 10. Signals may be staged by two cycles before writing to prevent timing problems. Capturing continues until another MTC0 instruction disables capturing or a triggering event occurs.

Figure 2:
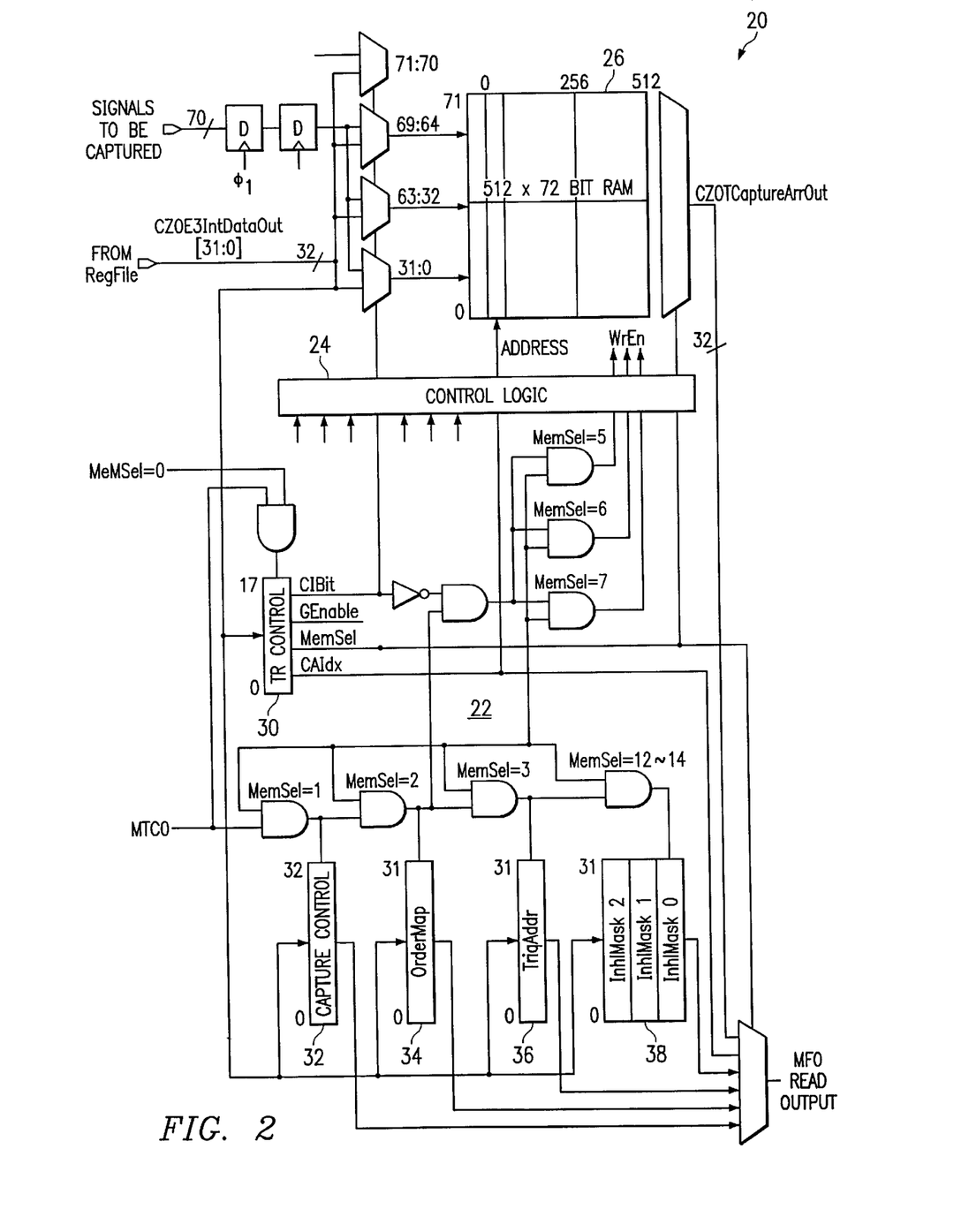
FIG. 2 illustrates a block diagram of a trace recorder of the microprocessor based integrated circuit.
Figure 3:
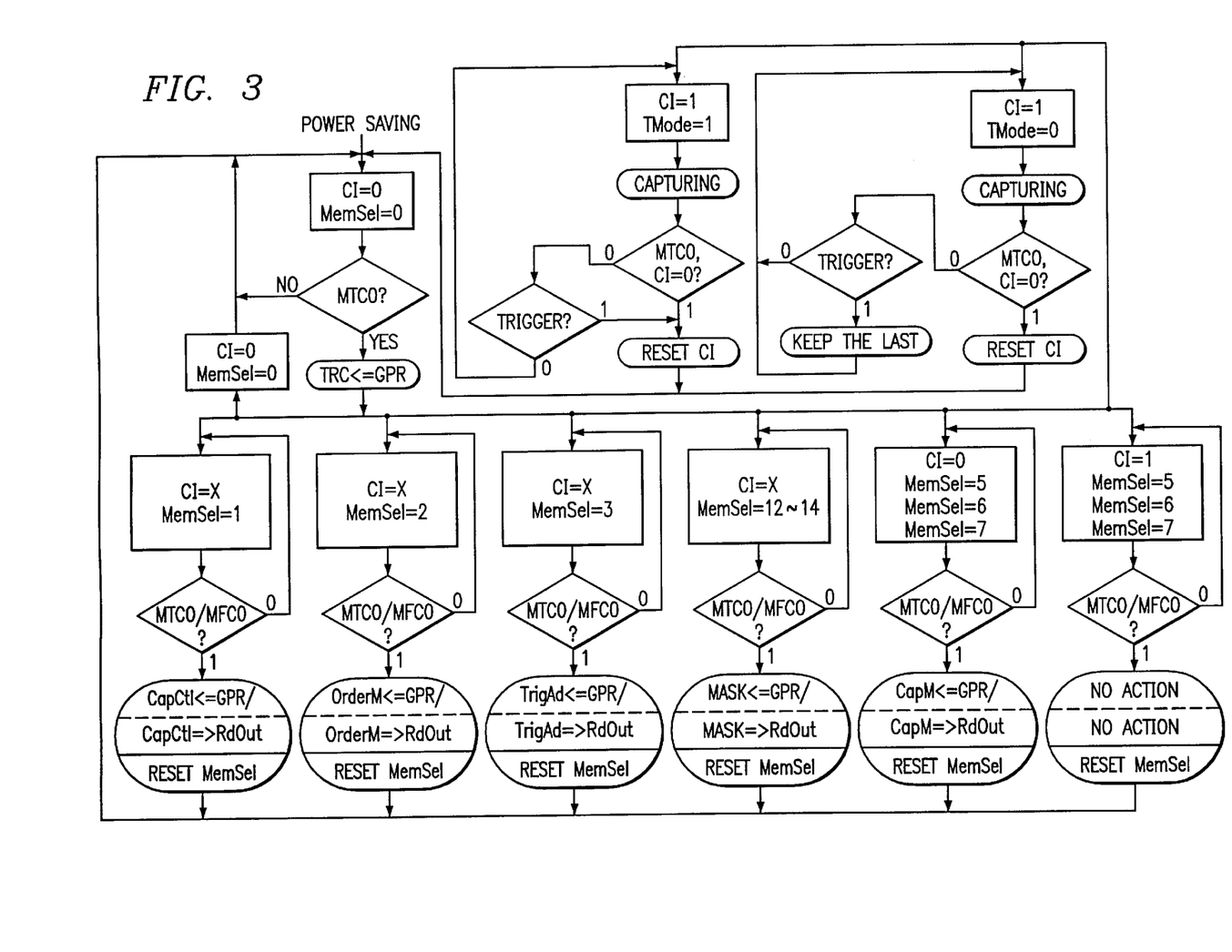
FIG. 3 illustrates a flow diagram of accessing configuration registers in the trace recorder in relation to its operating modes.

In capture mode, memory array 26 records important signals. Since the size of memory array 26 is limited for incorporation onto an integrated circuit with a microprocessor, recording needs to be very selective. Detection of a special event as a trigger point is performed in order to mark the cycles. Examples of triggering events include CPU hung, memory addressing reaches a pre-determined address, and a register matches a pre-determined value. These trigger events are designed to lead to more clues about a specific bug or failure. The easiest method is to start recording data as soon as the triggering event occurs. However, more important information just prior to a triggering event may lead to determining a cause of the failure. Thus, information associated with a triggering event is FIG. 2 is a block diagram of trace recorder 20. The main functional components of trace recorder 20 include memory array 26, control logic 24, and trigger logic 22. Trigger logic 22 uses configuration registers to implement the capture and trigger technique for trace recorder 20. These registers include a trigger control register 30, a capture control register 32, an order map register 34, a trigger address register 36, and inhibit mask registers 38. These registers set up the signal capture so that the most important segment of the signal traces are written into memory array 26. FIG. 3 shows a flow diagram of accessing the configuration registers in relation to the read/write and capture modes discussed above.

Trigger control register 30 provides enable and address signals for trace recorder 20. These signals are shown in Table 2. Trigger control register 30 generates a capture array index signal, a memory select signal, a global enable signal, and a capture indicator signal. The capture array index signal provides the addresses to memory array 26 to perform reads and writes in the read/write mode. In the capture mode, this signal provides the current recording pointer for profiling. The global enable signal provides the main enabling power for the other configuration registers and memory array 26 in trace recorder 20. The capture indicator signal provides a toggle indication as to whether or not data is to be captured. A single MFC0 instruction prior to a MTC0 instruction allows for reading of trigger control register 30.

TABLE 2

Trigger Control Register

| Bit | Field Name | Description |
|---|---|---|
| 8:0 | CAIdx | RW Mode: Index for the 512 entry capture memory<br>In Capture Mode: Current recording index pointer<br>After Capture Mode: Stop pointer |
| 11:9 | reserved | |
| 15:12 | MemSel | Memory Element Selection and Status<br>MemSel = 0: RW Command Mode; Select Trade Recorder Control Register.<br>MemSel! = 0: RW Data Mode; Select MemSel = 1,2,3,5,6,7,12,13,14 |
| 16 | GEnable | Global Enable Power Up |
| 17 | CIBit | Capture Indicator |

The memory select signal determines which configuration register of trace recorder 20 is selected or which portion of memory array 26 is desired. Table 3 shows the breakdown of the memory select signal. Memory array 26 and the configuration registers are directly writable to test and load the memory elements and directly readable to read data. Reading and writing is performed by executing a MTC0 instruction that sets the memory select signal. Another MTC0 or MFC0 instruction provides the data to be written or read out and, upon execution, clears the memory select signal. The default value for the memory select signal is zero. With the memory select signal at zero, trace recorder 20 is in a command mode waiting for a command MTC0 instruction in order to prepare the appropriate setup. When the memory select signal is not zero, trace recorder 20 awaits for a data MTC0 or data MFC0 to complete the write or read function. After completion, the memory select signal is returned to the zero state.

TABLE 3

Memory Selection

| Mem Sel | # of Bits | Description | Condition |
|---|---|---|---|
| 0 | 18 | Select the Trace Recorder Control Register | MTC0, MFC0 |
| 1 | 32 | Select Capture Control Register | MTC0, MFC0 |
| 2 | 32 | Select Order Map and Status Register | MTC0, MFC0 |
| 3 | 32 | Select Trigger Address Register | MTC0, MFC0 |
| 5 | 32 | Select bit 31:0 of the Capture Array | MTC0, MFC0, CI = 0 |
| 6 | 32 | Select bit 63:32 of the Capture Array | MTC0, MFC0, CI = 0 |
| 7 | 8 | Select bit 71:64 of the Capture Array | MTC0, MFC0, CI = 0 |
| 12 | 32 | Select Recording Inhibit Mask Register 0 | MTC0, MFC0 |
| 13 | 32 | Select Recording Inhibit Mask Register 1 | MTC0, MFC0 |
| 14 | 32 | Select Recording Inhibit Mask Register 2 | MTC0, MFC0 |

Capture control register 32 specifies how the capture is to occur and controls maintaining the data once it is captured. Table 4 shows what may be included in capture control register 32.

TABLE 4

Capture Control Register

| Bit | Field Name | Description |
|---|---|---|
| 0:11 | NCycleTrigger | TEvCPUHung = 1: NCycleTrigger defines the number of cycles that CPU hangs.<br>TEvCPUHung = 0: A trigger is generated for every NCycleTrigger cycles. |

TABLE 4-continued

Capture Control Register

| Bit | Field Name | Description |
|---|---|---|
| 14:12 | OldestPre | The oldest block number for current Pre-Trigger Buffer |
| 22:15 | MaxCount | NthCycleMode = 1: Inhibit MaxCount-1 cycles/events.<br>Profiling NEventMode : Record MaxCount events.<br>All other modes: MaxCount = 255. |
| 23 | LastTMode | LastTMode = 1: Last Trigger is recorded.<br>LastTMode = 0: First Trigger is recorded. |
| 24 | NEventMode | Interval Profiling, record MaxCount events where MaxCount < 64 |
| 25 | NThCycleMode | Nth cycle sampling mode, record the Nth cycle where N = MaxCount < 256. |
| 26 | TEvIVAMatch | Enable trigger event of IVA match |
| 27 | TEvWatchR | Enable trigger event of read access to address in Watch |
| 28 | TEvCPUHung | Enable CPU hung trigger event |
| 29 | TEvNCycles | Enable trigger generated every N cycles. TEvCPUHung must be zero. |
| 30 | reserved | |
| 31 | EverTriggered | Whether the trigger ever happened |

The NCycleTrigger signal determines how a trigger signal is generated. A trigger may be generated for every NCycleTrigger cycles when the TEvNCycles signal is enabled and the TEvCPUHung signal is disabled. With both the TEvNCycles and TEvCPUHung signals disabled, a trigger may be generated for every NCycleTrigger processor cycles. With the TevCPUHung signal enabled, the NCyclesTrigger signal defines the cycles that the CPU hangs. A CPU hung trigger is preferably based on a free running 12 bit processor clock counter that is reset whenever an instruction graduates. When the counter overflows, the CPU hung trigger is asserted. This allows for the capturing of activity leading up to a processor hang since after the hang the CPU may still be responding to interventions.

The OldestPre signal indicates the oldest valid location in memory array 26 prior to receipt of a trigger. The MaxCount signal provides for the recording of data for the number of events specified when the NEventMode signal is enabled. The MaxCount signal also provides for the recording of data for Nth cycle sampling upon enablement of the NTHCycleMode signal. A TEvIVAMatch signal, upon being enabled, causes a comparison of the contents of trigger address register 34 to bits in an IVA address. Upon a match and determination of a valid decoded instruction, a trigger may be generated. When a TEvWatchR signal is enabled, a trigger may be generated if either a read or write data access is made to the physical memory address in a CPU watch register. An EverTriggered signal informs as to the occurrence of at least one trigger, indicating whether useful data has been captured in memory array 26.

There are at least three types of recording modes that determine how to start and stop capturing data around a triggering event. These recording modes include a last trigger, a first trigger, and profiling. The LastTMode signal determines which of the last trigger and first trigger recording modes are implemented. For last trigger enablement, the data around the last trigger is recorded and maintained in memory array 26. For first trigger enablement, recording stops a desired number of cycles after the occurrence of the first trigger and the data is maintained in memory array 26 despite the occurrence of other triggers. Last trigger and first trigger enablement may also be implemented only for every Nth cycle or Nth event. The other type of recording mode is profiling wherein a number of events after a trigger are recorded. In profiling mode, there is at least one trigger every specified number of events. Table 5 summarizes the preferable recording modes.

TABLE 5

Recording Modes

| Name | Nth Cycle Mod | NEvent Mode | Last TMode | TEvCPU Hung | Stop Method | Data Format | Recording Inhibit | Limit |
|---|---|---|---|---|---|---|---|---|
| Last Trigger | 0 | 0 | 1 | X | MTCO Reset | Order Map | data no change | NPre = 1,...,4; NPost = 0,1,...,4 |
| First Trigger | 0 | 0 | 0 | X | NPost met resets CI | Order Map | data no change | NPre = 1,...,7; NPost = 0,1,...,7 |
| Profiling | 0 | 1 | 1 | 0 | MTCO Reset | Continue | data no change | NEvents < 64 |
| Profiling | 0 | 1 | 0 | 0 | RAM is Full, Reset CI | Continue | data no change | NEvents < 64 |
| Nth Cycle | 1 | 0 | 1 | X | MTCO Reset | Order Map | Count < N | N < 256 |
| Nth Cycle | 1 | 0 | 0 | X | NPost met resets CI | Order Map | Count < N | N < 256 |
| Nth Event | 1 | 1 | 1 | X | MTCO Reset | Order Map | Count < N | N < 256 |
| Nth Event | 1 | 1 | 0 | X | NPost met resets CI | Order Map | Count < N | N < 256 |

Order map register 34 specifies the ordering for data as it is recorded in memory array 26. Table 6 shows what may be included in order map register 34. Preferably, memory array 26 is partitioned into 8 blocks with each block being available in a desired order to record data. The OrderMap signals provide an address for one of the 8 blocks and establishes the ordering of the recorded data. The NPre signal specifies the number of blocks for recording and keeping before an occurrence of a trigger. The NPost signal specifies the number of blocks for recording and maintaining after the occurrence of a trigger. The ShiftWrap signal indicates a Pre-Trigger wrap-around state. The StatePost signal indicates a Post-Trigger state. If the ShiftWrap and StatePost signals are disabled, then ordering is in a Pre-NoWrap state with no rearranging ordering. If the ShiftWrap signal is enabled, then ordering is in a WaitTrigger state and wrap around shift reordering is implemented. If the State-Post signal is enabled, then ordering is in a post-Trigger state with no rearranging ordering. Preferably, the initial state is PreNoWrap unless the NPre signal is zero wherein the initial state is WaitTrigger. Further information on a specific order map implementation can be found in co-pending U.S. application Ser. No. 09/788,175 entitled "Device and Method for Storing Information in Memory" which is hereby incorporated by reference herein.

TABLE 6

Order Map and Status Register

| Bit | Field Name | Description |
|---|---|---|
| 2:0 | OrderMap0 | Order Map values at entry 0 |
| 5:3 | OrderMap1 | Order Map values at entry 1 |
| 8:6 | OrderMap2 | Order Map values at entry 2 |
| 11:9 | OrderMap3 | Order Map values at entry 3 |
| 14:12 | OrderMap4 | Order Map values at entry 4 |
| 17:15 | OrderMap5 | Order Map values at entry 5 |
| 20:18 | OrderMap6 | Order Map values at entry 6 |
| 23:21 | OrderMap7 | Order Map values at entry 7 |
| 26:24 | NPre | The number of blocks in Pre-Trigger buffer. |
| 29:27 | NPost | The number of blocks in Post-Trigger buffer. |
| 30 | ShiftWrap | The state variable indicating the Pre-Trigger wrap-around state |
| 31 | StatePost | The state variable indicating the Post-Trigger state |

Figure 4:
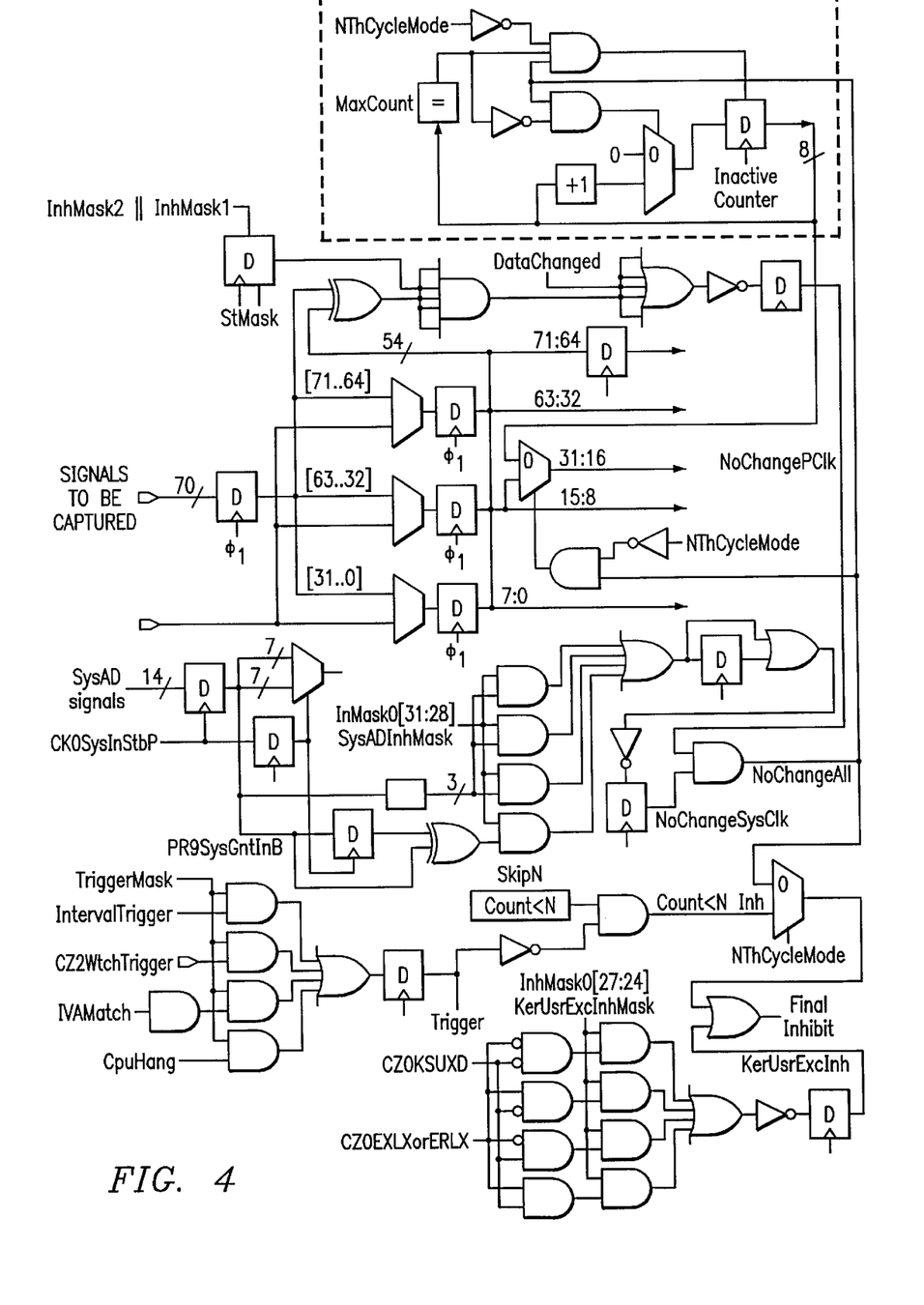
FIG. 4 illustrates an example of logic for inhibiting the recording of data in the trace recorder.

FIG. 4 shows example logic for inhibiting the recording of data in memory array 26. Inhibit mask registers 38 provide a capability to inhibit the recording of data. To make efficient use of the limited memory space within memory array 26, cycles are recorded only when specific criteria is met and other cycles are skipped. When the capture indicator signal of trigger control register 30 is enabled, memory array 26 will capture activity every cycle if it is not inhibited. There are at least four inhibit signals with appropriate masks that perform the inhibit operation. Table 7 shows these recording inhibit signals.

TABLE 7

Recording Inhibit Signals

| Inhibit Signal Name | Mask Name | Description |
|---|---|---|
| NoChangePClk | Signal Mask Register | No change for signals synchronized with processor clock. |
| NoChangeSysClk | SysAD Inhibit Mask | No change for signals synchronized with SysClk. |
| KerUsrExc | KerUsrExc Inhibit Mask | Wether program is in Kernal/User and/or Exception mode. |
| Count < N | NCycle | Skip N cycles |

The NoChangePClk signal detects for changes of certain signals when synchronized with the processor clock through masking with first and second inhibit masks. If there is no change in the data, then data is not recorded. Tables 8, 9, and 10 show examples of inhibit mask registers that may be used.

TABLE 8

Recording Inhibit Mask Register 0

| Mask Bit | Name of Signals Masked | # Bit | Description |
|---|---|---|---|
| 22:0 | rserved | 23 | reserved |
| 23 | lvasel | 1 | IVASEL = 0 select ld/st MRT degub signals IVASEL = 1 select IFODOIVA [31:16] |

TABLE 8-continued

Recording Inhibit Mask Register 0

| Mask Bit | Name of Signals Masked | # Bit | Description |
|---|---|---|---|
| 27:24 | KerUrsExc Inhibit Mask | 4 | bit 27: Inhibit when process is in exception and user mode.<br>bit 26: Inhibit when process is in exception mode, but not in user mode.<br>bit 25: Inhibit when process is not in exception mode, but in user mode.<br>Bit 24: Inhibit when process is not in exception mode, not in user mode. |
| 31:28 | SysAD Inhibit Mask | 4 | bit 27: Inhibit when PR9SysRespValInB is asserted.<br>bit 27: Inhibit when PR9SysValInB is asserted and SysCmd[11] = 0.<br>bit 27: Inhibit when PR9SysValInB is asserted and SysCmd[11] = 1.<br>bit 27: Inhibit when PR9SysGntB changes. |

TABLE 9

Recording Inhibit Mask Register 1

| Mask Bit | Name of Signals Masked | # Bit | Description |
|---|---|---|---|
| 0 | reserved | 1 | reserved |
| 31:1 | | 31 | mask signals going to field 31:1 of Trace Recorder Cache Memory |

TABLE 10

Recording Inhibit Mask Register 2

| Mask Bit | Name of Signals Masked | # Bit | Description |
|---|---|---|---|
| 22:0 | | 23 | mask signals going to field 54:32 of Trace Recorder Cache Memory |
| 31:23 | reserved | 9 | reserved |

The KerUsrExc signal indicates whether the program is in a user and/or exception mode. Inhibit may occur if either, neither, or both modes are asserted. This inhibit may be used in conjunction with certain bits of the processor status register. The CZ0KSUXD signal indicates that CPU 12 is in user mode and CZ0EXLXorERLX indicates that CPU 12 is in exception mode. Table 11 shows when the KerUsrExc signal is asserted.

TABLE 11

KerUsrExc Inhibit

| CZ0KSUXD | CZ0EXLXorERLX | KerUsrExc Inhibit Signal |
|---|---|---|
| 0 | 0 | 1 ifbit[24] = 1 |
| 0 | 1 | 1 ifbit[25] = 1 |
| 1 | 0 | 1 ifbit[26] = 1 |
| 1 | 1 | 1 ifbit[27] = 1 |

The NoChangeSysClk signal detects for changes in the SysAD signals synchronized with the system clock. No change in data will result in no data being recorded. Table 12 shows when the NoChangeSysClk signal is asserted.

TABLE 12

SysAD Inhibit

| | Sys Cmd[11] | NoChangeSysClk | Comments |
|---|---|---|---|
| PR9SysGntB changes | X | 1 ifbit[28] = 1 | |
| PR9SysValInB asserted | 1 | 1 ifbit[29] = 1 | valid SysAD data |
| PR9SysValInB asserted | 0 | 1 ifbit[30] = 1 | valid SysAD command |
| PR9SysRespValInB asserted | X | 1 ifbit[31] = 1 | |

The Count<N signal provides for capturing of data every Nth cycle and inhibits for the intervening N−1 cycles. A trigger cycle is preferably recorded despite a Count<N inhibit request. Table 13 shows a summary of when recording is performed or inhibited.

TABLE 13

Recording Inhibit

| Action | KerUsrExc Inhibit | NThCycle Mode | Count < N Inhibit | NoChangeAll Inhibit |
|---|---|---|---|---|
| Record | 0 | X | 0 | 0 |
| Record | 0 | 0 | X | 0 |
| Inhibit | 0 | 0 | X | 1 |
| Record | 0 | 1 | 0 | X |
| Inhibit | 0 | 1 | 1 | X |
| Inhibit | 1 | X | X | X |

Figure 5:
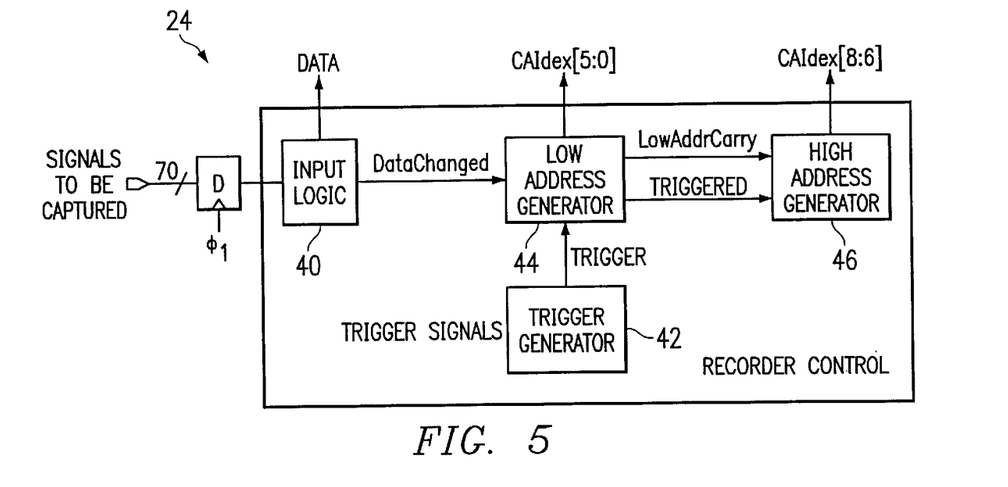
FIG. 5 illustrates a simplified block diagram of control logic for the trace recorder.
Figure 6:
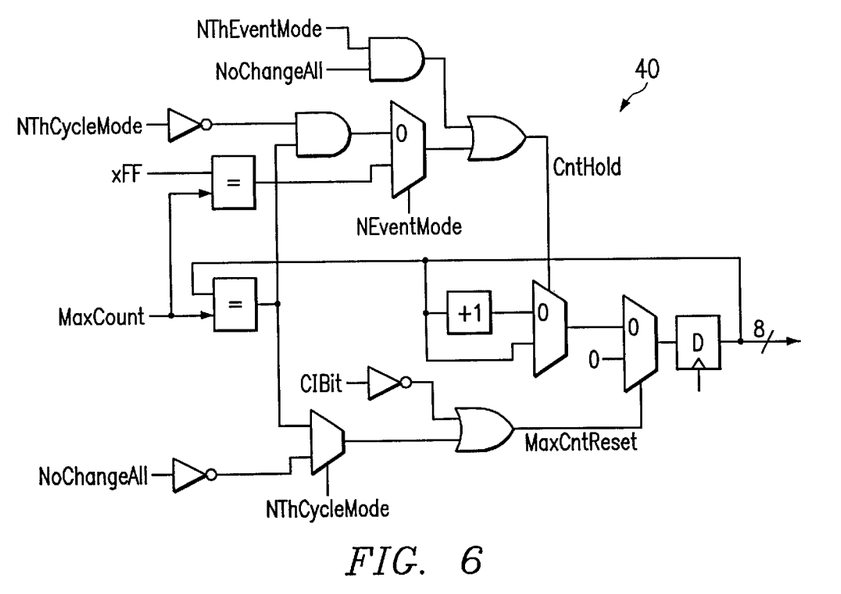
FIG. 6 illustrates an example logic design for input logic of the control logic.
Figure 7:
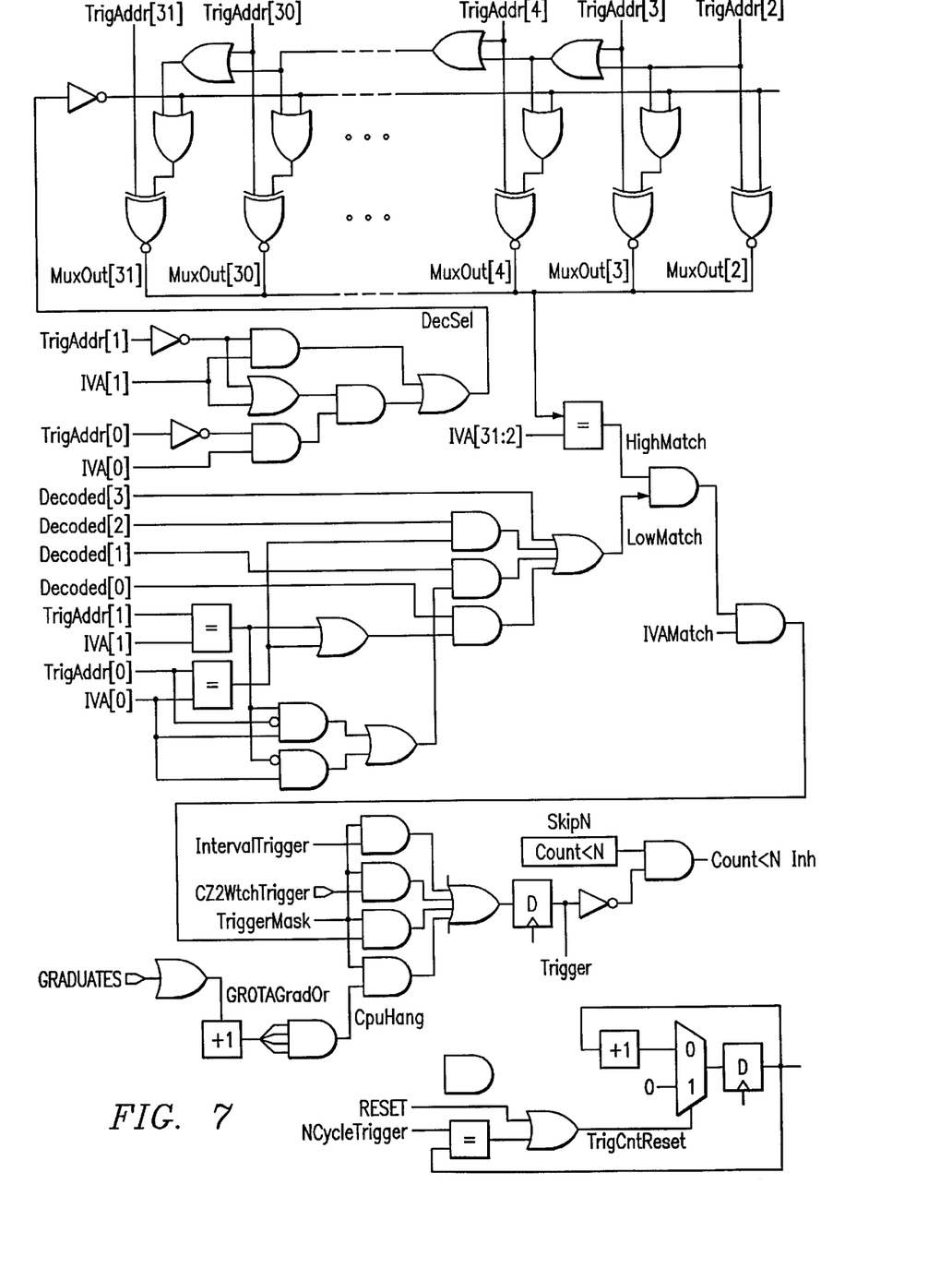
FIG. 7 illustrates an example logic design for a trigger generator of the control logic.
Figure 8:
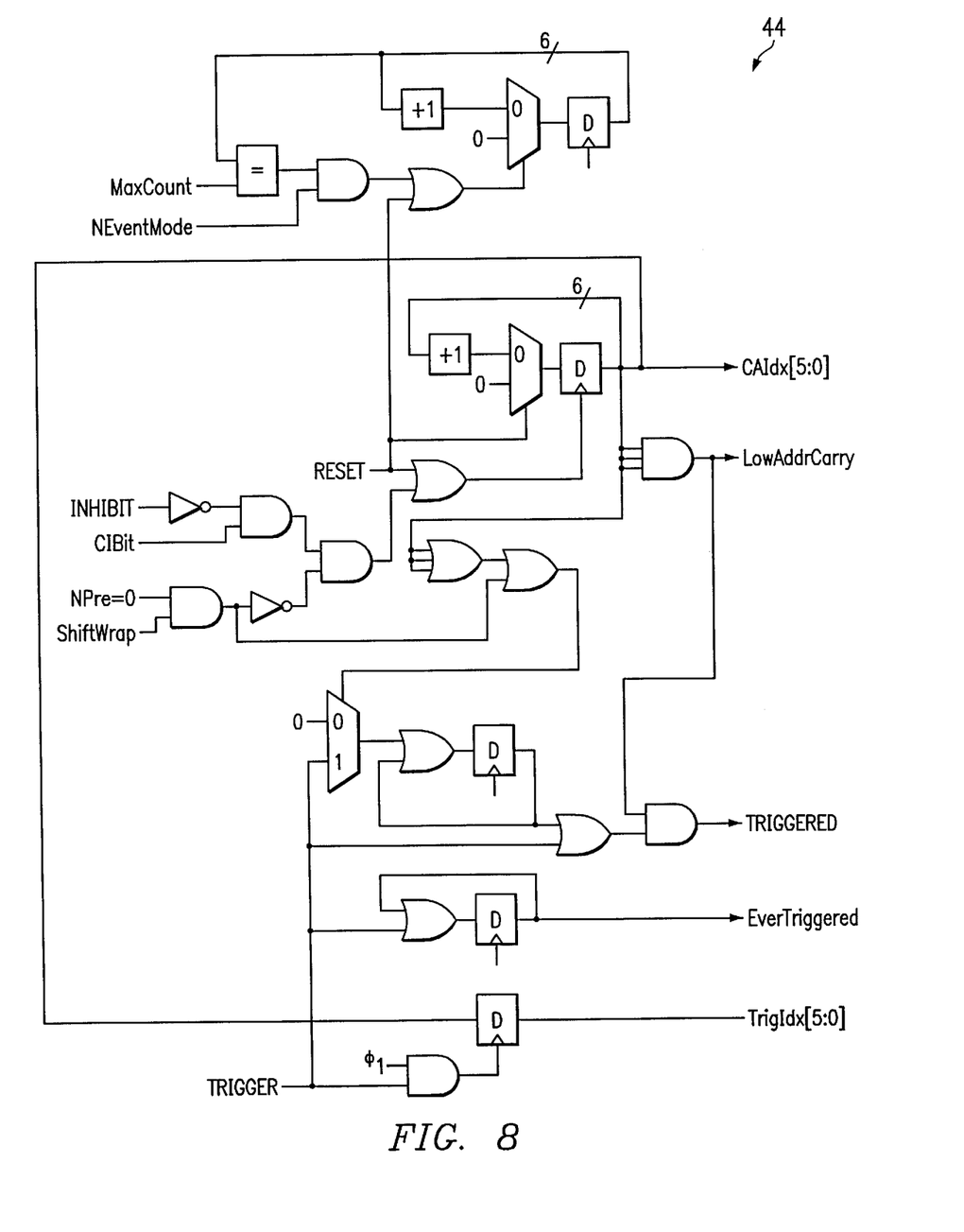
FIG. 8 illustrates an example logic design for a low address generator of the control logic.
Figure 9:
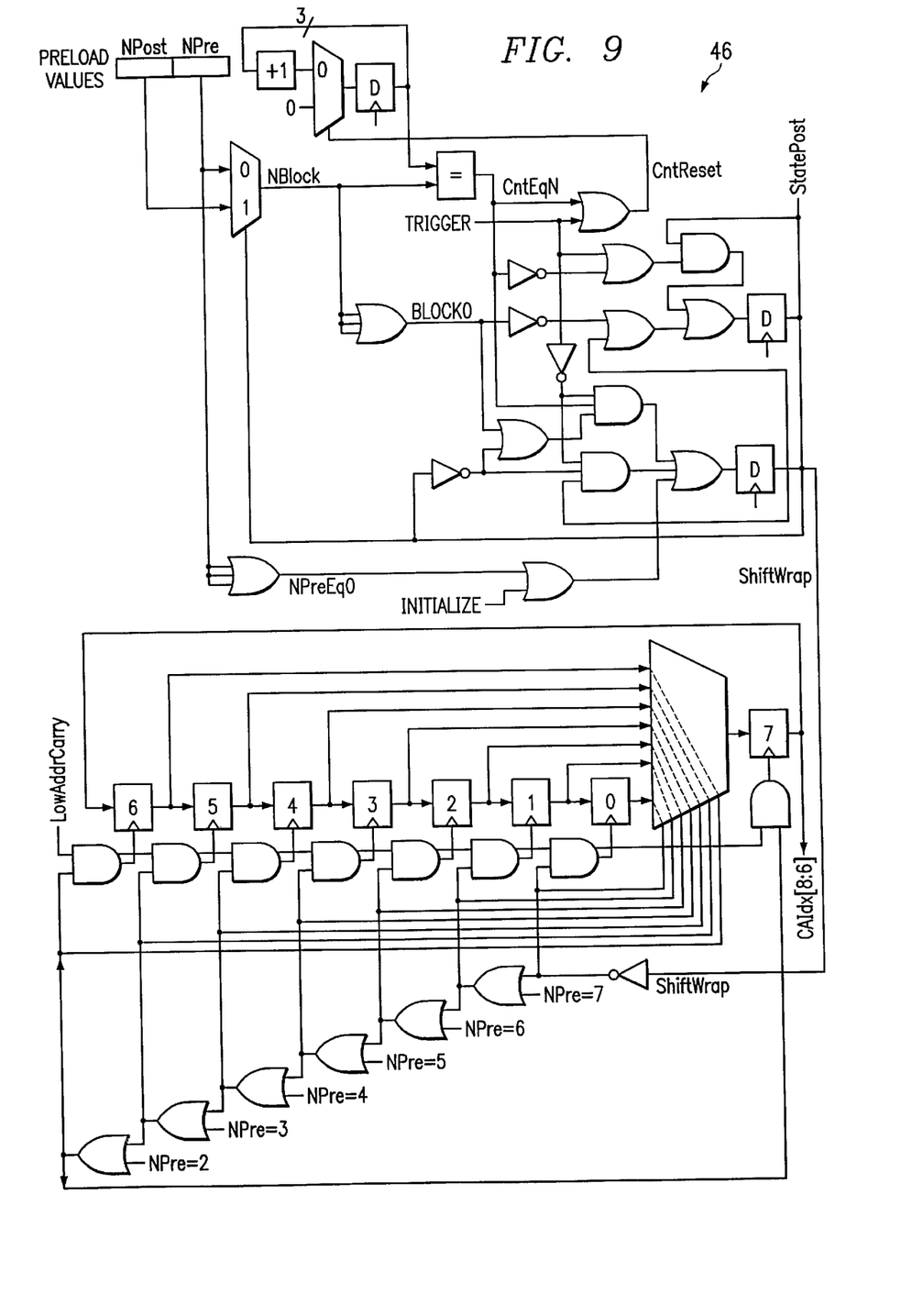
FIG. 9 illustrates an example logic design for a high address generator of the control logic.
Figure 10:
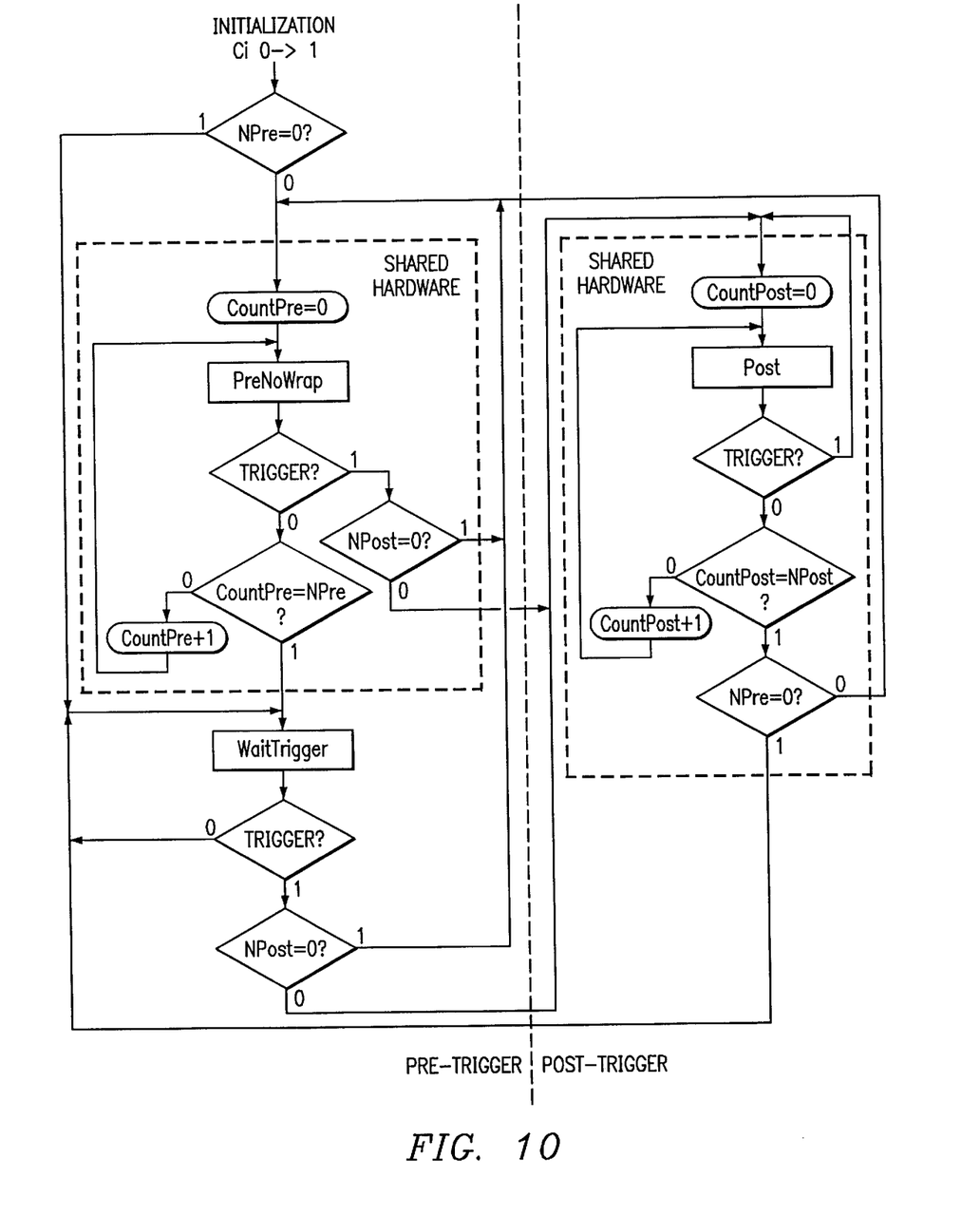
FIG. 10 illustrates a flowchart summarizing operation of the high address generator.

FIG. 5 shows a block diagram of control logic 24. The function of control logic 24 is to generate the memory addresses and write enables to memory array 26 for capture mode operation and to update the configuration registers. Control logic 24 includes input logic 40, a trigger generator 42, a low address generator 44, and a high address generator 46. FIG. 6 shows an example logic design for input logic 40. Input logic 40 detects input signal changes and generates an inactivate count. FIG. 7 shows an example logic design for trigger generator 42. Trigger generator 42 generates a trigger signal corresponding to a triggering event. Low address generator 44 generates the lower address field in accessing memory array 26. It also updates the trigger index and the ever triggered status bit. An example of logic for low address generator 44 is shown in FIG. 8. The high address generator 46 generates the higher address field in accessing memory array 26. An example of logic for high address generator 46 is shown in FIG. 9. A flowchart summarizing the operation of high address generator 46 is shown in FIG. 10.

After debugging of a processor, trace recorder 20 may be used in a profile mode. In profile mode, trace recorder 20 may be set up to record certain processor activity during its execution of instructions. For example, trace recorder 20 may be set up to record activity around a certain instruction or set of instructions. Trace recorder 20 may identify how many active instructions are being executed simultaneously and what instructions overlap other instructions. A different set of cycles or events may be specified as compared to operation of trace recorder 20 in the debug mode. The profile mode thus provides for a selective recording capability that is not dependent on fault triggering.

Specific examples of operation in the profiling mode include the following. Activity with respect to a key routine may be recorded for study and analysis. Multi-sample cycles or events of activity may be recorded while the routine is running. In this manner, execution of the specific routine can be studied and analyzed for its efficiency. Activity may also be recorded when data is requested and returned from main memory. In this manner, program execution may be profiled at the time of restart once the requested data has been received from main memory. Captured information may also identify how quickly a central processing unit recovers in response to a cache miss or a memory request/once the desired data has been retrieved. Activity may also be recorded for cache misses)to determine whether the cache miss is an isolated event or if there are a cluster of cache misses that affect program execution. Sampling may be performed around a certain instruction or an instruction or memory address. Sampling may also be performed in user mode or kernel mode in order to distinguish system activity from user activity. Other examples of profile mode recording may be readily apparent and ascertainable by those skilled in the art.

Thus, it is apparent that there has been provided, in accordance with the present invention, a method and apparatus for recording trace data in a microprocessor based integrated circuit that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for recording program execution in a microprocessor based integrated circuit, comprising:
   determining an execution point in a program running in a central processing unit of the microprocessor based integrated circuit;
   capturing program activity generated and received by the central processing unit in the microprocessor based integrated circuit during execution of the program associated with the execution point, the program activity being captured immediately prior to and immediately subsequent to the execution point.

2. The method of claim 1, wherein the execution point is associated with a specific routine of the program.

3. The method of claim 1, wherein the execution point is associated with a request for data from a main memory.

4. The method of claim 1, wherein the execution point is associated with a cache miss.

5. The method of claim 1, wherein the execution point is associated with a certain instruction executed in the program.

6. The method of claim 1, wherein the execution point is associated with a certain instruction address.

7. The method of claim 1, wherein the execution point is associated with a certain memory address.

8. The method of claim 1, wherein the program activity is captured over a set number of program execution cycles.

9. The method of claim 1, wherein the program activity is captured over a set number of program execution events.

10. The method of claim 1, wherein the captured program activity identifies a recovery speed for the central processing unit upon retrieving requested data.

11. A microprocessor based integrated circuit, comprising:
   a central processing unit operable to execute a program;
   an instruction cache in communication with the central processing unit and operable to store program instructions for execution;
   a data cache in communication with the central processing unit and operable to store data for use by the program;
   a trace recorder operable to capture profile information passed between the central processing unit and the instruction and data caches and associated with an execution point of the program, the trace recorder operable to capture profile information immediately prior to and immediately subsequent to the execution point.

12. The integrated circuit of claim 11, wherein the execution point is associated with a data request by the central processing unit wherein the data is not available in the data cache.

13. The integrated circuit of claim 11, wherein the trace recorder captures profile information over either one of a set number of execution cycles or a set number of events of program execution.

14. The integrated circuit of claim 11, wherein the execution point is associated with any of a certain instruction, a certain instruction address, and a memory address encountered during execution of the program.

15. The integrated circuit of claim 11, wherein the trace recorder is operable to provide the captured profile information for analysis of program execution.

16. A method for capturing program execution in a microprocessor based integrated circuit, comprising:
   identifying an execution point in a program being executed in a central processing unit of the microprocessor based integrated circuit;
   transferring profile information associated with execution of the program between the central processing unit and an instruction cache and a data cache of the microprocessor based integrated circuit;
   capturing selective profile information in a trace recorder of the microprocessor based integrated circuit corresponding to the execution point, the profile information being captured immediately prior to and immediately subsequent to the execution point.

17. The method of claim 16, wherein the selective profile information is captured according to either a number of cycles or a number of events of program execution.

18. The method of claim 16, wherein the execution point is associated with any one of a certain instruction, a certain instruction address, and a memory address encountered during execution of the program.

19. The method of claim 16, further comprising:
   programming the trace recorder to establish the execution point and the selective profile information to be captured.

20. The method of claim 16, further comprising:
   providing the selective profile information for analysis of program execution.

* * * * *